May 12, 1936.     W. E. KUENTZEL ET AL     2,040,658
CATALYTIC PROCESS
Filed Nov. 8, 1934
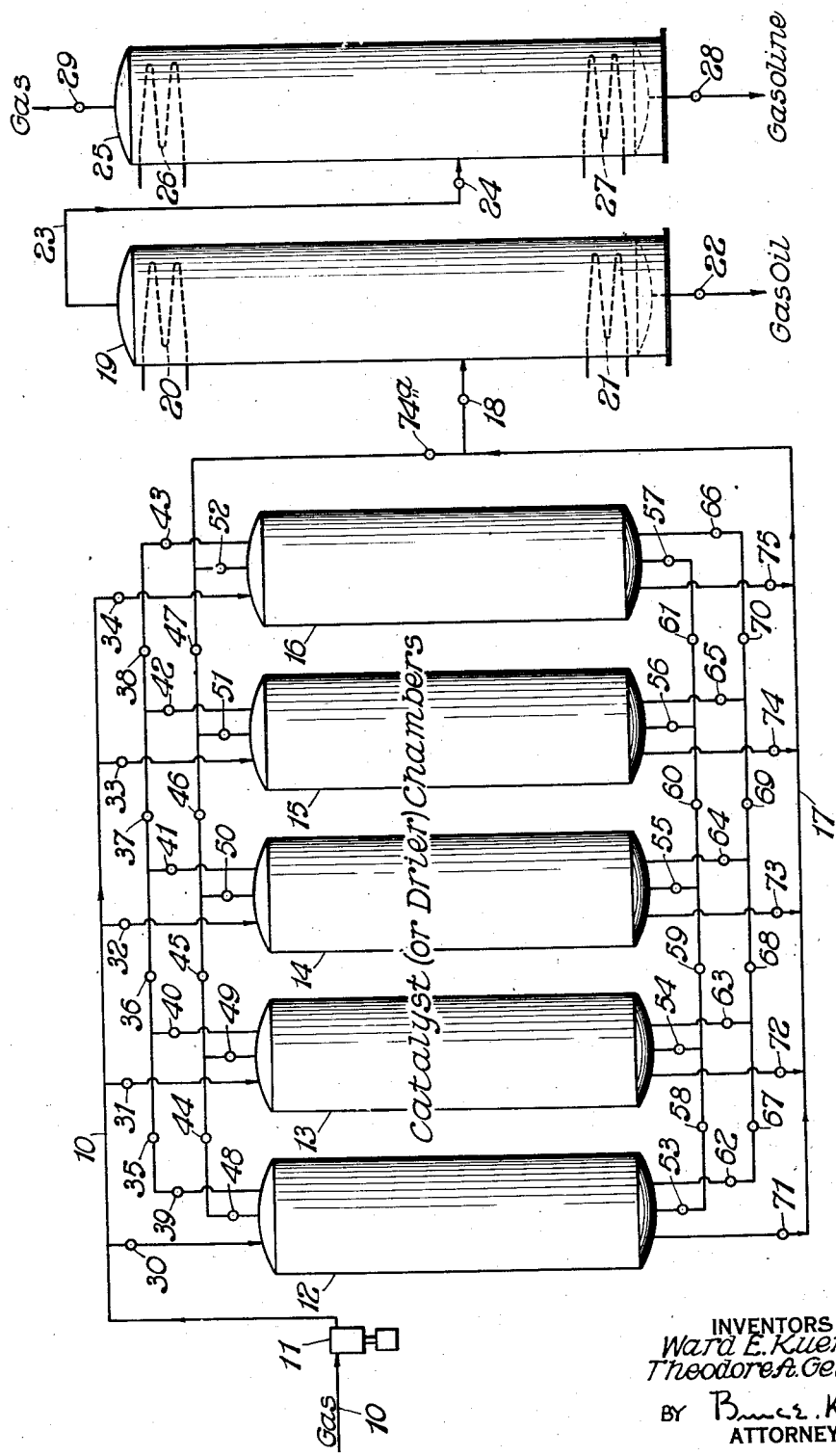
INVENTORS
Ward E. Kuentzel
Theodore A. Geissman
BY Bruce K. Brown
ATTORNEY ns
UNITED STATES PATENT OFFICE 2,040,658

CATALYTIC PROCESS

Ward E. Kuentzel, Whiting, Ind., and Theodore A. Geissman, Minneapolis, Minn., assignors to Standard Oil Company, Chicago, Ill., a corporation of Indiana Application November 8, 1934, Serial No. 752,066

4 Claims. (Cl. 196—10)

Our invention consists of an improvement in the catalytic conversion of unsaturated normally gaseous hydrocarbons to normally liquid hydrocarbons. More specifically it relates to an improved process wherein the spent catalyst is utilized for the preliminary drying of the gases entering the active catalyst chamber or chambers.

Normally gaseous unsaturated hydrocarbons and particularly the normally gaseous olefins or unsaturated hydrocarbons of the ethylene series can be converted into low boiling and medium boiling liquids of the character of gasoline and light gas oil by various catalysts. We have found, however, that for the use of many of the desirable catalysts for this conversion the reacting gases must be very thoroughly dried before entering the catalyst chamber. Furthermore, we have found that even when such thorough preliminary drying is practiced the catalyst does not retain its initial activity indefinitely, but after a certain period of time loses its catalytic activity to a degree which necessitates regeneration or replacement.

One modification of our invention consists in supporting the catalyst on a solid support material which is inert as regards catalytic polymerization of olefins but is of desiccative character, i. e. possesses the power of absorbing and binding water from gaseous or liquefied materials which are passed through or over a bed of such material. As another modification of our invention, we have found that certain types of desirable catalysts for the polymerization of gaseous olefins possess in and of themselves sufficient desiccative power for the successful operation of our improved process. In other words, if we mount such catalysts on normally inert support material such as pumice or the like, we find that a charge of catalyst which has lost all or most of its catalytic activity still possesses sufficient water absorbing or desiccative capacity for use in our process.

In either of the above modifications of our improved process we may utilize a plurality of catalyst drums so arranged and interconnected that we may pass our reacting gases through them in any order or sequence. By this means one or more drums containing spent catalyst may act as a drier preceding one or more drums containing active catalyst, while one or more additional drums may be in process of being emptied and recharged or in process of revivification in situ.

As catalysts we prefer to use substances of the aluminum halide stable double salt type such as are formed in various molecular combining proportions by aluminum chloride or aluminum bromide with various other metallic halides as exemplified by sodium chloride, sodium bromide, lithium chloride, lithium bromide, cuprous bromide, mercuric bromide, calcium chloride, barium chloride, antimony chloride, antimony bromide. The stable double salts of the above type possess very considerable catalytic activity for the polymerization of unsaturated gases to liquids but do not exhibit uncontrollably violent catalysis which characterizes aluminum chloride per se. These double salts are further characterized by a very considerable physical stability, i. e. low vapor pressure at elevated temperatures, which is a desirable characteristic in our process. Catalysts of this type are, however, adversely affected by moisture and we have found that incoming materials must be thoroughly dried or the catalyst life is of very short duration.

For example, using sodium chloro aluminate with an inlet gas containing approximately 31% propylene and 69% propane at 350° F. and 750 lbs. pressure per sq. in. and a space velocity of 3400 cu. ft. of free gas (measured at atmospheric pressure and 60° F.) per cu. ft. of free catalyst volume per hour, we obtain initial conversions to liquid products in the vicinity of 80–100% by weight of the gaseous olefins in the charge. This conversion is sensibly constant under these conditions for a period of approximately 20 hours, after which, however, the conversion falls off very rapidly and by 30 hours may be as low as 5–10% of the entering olefins. On the other hand, if the incoming gases contain appreciable amounts of moisture, the active life of the catalyst under the above conditions will be measured in minutes rather than in hours.

We may also use other types of catalysts such as double salts of an aluminum halide with two or more metallic halides, double salts of two aluminum halides with one or more other metallic halides, or doubles salts of aluminum halide with iron halide and one or more other metallic halides. We may also use aluminum chloride, zinc chloride and ferric chloride alone or other catalyst susceptible to deterioration by moisture.

As supporting materials for the above catalysts we may use any suitable granular material such as pumice, coke, and oxides of the type of aluminum oxide, zirconium oxide and chromium oxide, and such inert and non-desiccative support materials will be satisfactory in our process provided the feed gases are relatively dry and the catalyst itself is sufficiently desiccative in character. If relatively wet feed gas must be used or if the catalyst itself, though deteriorated by water, is a relatively poor desiccative agent, we prefer to use as support material solid crystalline substances which have a strong tendency to absorb water, these being exemplified by "anhydrous" calcium chloride, sodium sulfate, or calcium sulfate and phosphorus pentoxide. We may also use water absorbent materials as exemplified by various materials of an inert character such as certain clays, bentonite, dehydrated silica gel, etc. which have the property of absorbing considerable amounts of moisture by capillary action, or similar physical mechanism.

While we prefer to use a desiccative support which retains its physical structure, despite absorption of water therein, this is not essential. For example, in the case of calcium chloride this material will gradually liquefy as it absorbs water but this need not interfere with the operation of our process. The following is an example of the results obtained by the use of calcium chloride as a support for sodium chloroaluminate. A small catalyst chamber was charged with granular calcium chloride impregnated with sodium chloroaluminate. The total apparent volume of the catalyst was 60 cc. The catalyst was heated to a temperature of 350° F. and the hydrocarbon gas was passed through under a pressure of 750 pounds per square inch, at the rate of 235 grams per hour. The hydrocarbon gas was a mixture of 29.3% propylene, the remainder being propane. After operating for one and a half hours there was obtained 66.2 grams of liquid product. This corresponds to a conversion of 60.1% of the entering propylene. The liquid product obtained had a gravity of 47.6° A. P. I.

In the case of certain of the above catalysts the spent catalyst itself will act as a desiccative agent and may, therefore, be supported on an inert and non-desiccative material such, for example, as pumice or the like. Catalysts of the aluminum halide stable double salt type come in this category. In this case when a catalyst drum has lost its catalytic activity we merely shift the gas stream and utilize this drum as a drying drum until such time as the catalyst has finally also lost its desiccative ability, following which it is either regenerated and dehydrated in situ or is removed and replaced. In this modification of our process we find certain quantities of dry hydrogen chloride to be evolved from the spent catalyst during its use as a desiccative agent, which is advantageous since this dry hydrogen chloride gas is carried forward by the other gases into the active catalyst drums wherein it has a tendency to revivify the catalyst continuously and thus prolong its active life.

While the particular apparatus for carrying out our process constitutes no part of our invention, our process may be described more fully and clearly by reference to the attached drawing which forms part of this specification and which represents a diagrammatic elevational view of suitable apparatus for carrying out our process.

With any of the foregoing catalysts and with feed gas containing from 15–70% by weight of gaseous olefins, we prefer to operate in the temperature range of 200–550° F. in the pressure range of 200–1000 lbs. per sq. in. above atmospheric and in the time range corresponding to rates of flow of 400–8000 cu. ft. of free gas (measured at atmospheric pressure and 60° F.) per cu. ft. of free catalyst volume per hour. However, we may operate at pressures as high as 3000 lbs. per sq. in. and we may use corresponding rates of flow of 24000 cu. ft. per hour.

Referring to the drawing, unsaturated gases containing from 15–70% of olefins by weight are introduced by line 10 and are passed by pump or compressor 11 to the drier and catalyst chambers 12, 13, 14, 15 and 16. The final polymerized products leave through line 17 and pass through valve 18 to a fractionating system wherein liquid and gaseous products are recovered and separated. We have illustrated this fractionating system purely diagrammatically by fractionator 19 with top cooling means 20 and bottom heating means 21 wherein products heavier than gasoline are separated and withdrawn through line 22 while gasoline vapors and uncondensed gases are removed through line 23 and valve 24 to fractionator 25 which is provided with top cooling means 26 and bottom cooling means 27 and wherein gasoline is separated and withdrawn through outlet 28 while unconverted gases are removed through line 29. It will be understood that we may use any other suitable fractionating system and may use any suitable or desired additional devices in connection with the system illustrated by fractionators 19 and 25 such as additional cooling means, heating means, interchangers, pumps, etc. We may, for example, absorb the liquid reaction products in a suitable absorber oil and recover the gasoline therefrom.

Drier and catalyst chambers 12 to 16, inclusive, are provided with suitable valved connections whereby the flow of gases from inlet line 10 to outlet line 17 may take place through any desired sequence of the chambers. We have illustrated a possible arrangement of valved connections in the drawing, these being numbered 30 to 75, inclusive.

It is unnecessary to describe all possible variations in flow through these chambers but one or two of the variations may be described. For example, we may desire to use drum 12 as a drying chamber while using drum 16 and drum 14 in that order as catalyst chambers. In this case, all of valved connections 30–75 inclusive being closed except as hereinafter mentioned, we will open valved connections 30, 62, 67, 68, 69, 70, 66, 52, 47, 46, 50 and 73, whereby the desired sequence of flow is obtained.

If we have been operating in accordance with the above arrangement and it becomes necessary to change to a fresh catalyst drum, we will ordinarily cut drum 12 out of the system for regeneration or refilling, and drum 16 will become the drying drum from which the gas will pass first to drum 14 and then, for example, to drum 15. In this case, all other valved connections being closed, we may open valved connections 34, 66, 70, 69, 64, 41, 37, 42 and 74, thus obtaining the desired sequence of flow.

As another example of a possible arrangement we may use two drums as drying drums and two drums as catalyst drums. For example, we may use drums 13 and 15 as drying drums and 14 and 16 as catalyst drums, in that order. In this case, all other valved connections being closed, we will open valved connections 31, 54, 59, 60, 56, 51, 46, 50, 64, 69, 70, 66, 52 and 74a, thus obtaining the desired sequence of flow.

Other possible arrangements will be obvious. As previously stated, the apparatus illustrated in the drawing is purely diagrammatic and illustrative. For example, we have illustrated and described a type of flow wherein the flow through the first drum is downwards and alternatingly upwards and downwards thereafter. We do not limit ourselves to such flow and in fact, we ordinarily prefer to use down flow through all driers and catalyst chambers, thus avoiding reversing the flow of the gases in individual chambers during operation. We ordinarily prefer to provide cooling means (not shown) disposed internally in the various catalyst chambers 12 to 16, inclusive, or prefer to construct these chambers in tubular form with provision for external cooling of the catalyst tubes by any suitable means.

The foregoing being a full and clear description of our invention, we are not limited thereby, except as hereinafter set forth in the following claims.

We claim:

1. In a process for the catalytic polymerization of unsaturated olefin containing gases to liquid products wherein the gases are passed successively through a drying stage and a catalytic stage using, respectively, exhausted and active polymerization catalysts having an affinity for moisture, at temperatures of 200–550° F. and under pressures of 200–1000 lbs./sq. in. and at a rate of flow of 400–8000 cu. ft. of free gas per cu. ft. of free catalyst volume per hour, the step of passing said gas first through the drying stage whereby exhausted catalyst is utilized as drying material for incoming gases to thereby remove moisture therefrom prior to passing through the catalytic stage.

2. In a process for the catalytic polymerization of unsaturated olefin containing gases to liquid products in the presence of an aluminum halide double stable salt catalyst mounted on an inert material, wherein the gases are passed successively through a drying stage and a catalyst stage using, respectively, exhausted and active aluminum halide double salt, the step of passing said gas first through the drying stage whereby exhausted catalyst is utilized as drying material for incoming gases to thereby remove moisture therefrom prior to passing through the catalytic stage.

3. In a process for the catalytic polymerization of unsaturated olefin containing gases to liquid products in the presence of an aluminum halide double stable salt catalyst mounted on an inert desiccative material, wherein the gases are passed successively through a drying stage and a catalytic stage using, respectively, exhausted and active aluminum halide double salt, the step of passing said gas first through the drying stage whereby exhausted catalyst and its inert desiccative material are utilized as drying material for incoming gases to thereby remove moisture therefrom prior to passing through the catalytic stage.

4. In a process for the polymerization of unsaturated olefin containing gases to liquid products in the presence of a catalyst comprising a metallic halide capable of absorbing moisture and subject to deterioration thereby, the steps of passing said unsaturated gases through a body of said catalyst which has lost substantially all of its catalytic power to remove moisture from said gases and thereafter passing the gases through an active body of catalyst to effect polymerization thereof.

WARD E. KUENTZEL.
THEODORE A. GEISSMAN.